United States Patent [19]
White, Jr.

[11] Patent Number: 5,893,069

[45] Date of Patent: Apr. 6, 1999

[54] SYSTEM AND METHOD FOR TESTING PREDICTION MODEL

[75] Inventor: Halbert L. White, Jr., Del Mar, Calif.

[73] Assignee: QuantMetrics R&D Associates, LLC, San Diego, Calif.

[21] Appl. No.: 790,716

[22] Filed: Jan. 31, 1997

[51] Int. Cl.$^6$ .................................................. G06F 17/60
[52] U.S. Cl. .................................. 705/1; 705/7; 705/11; 702/179; 702/182
[58] Field of Search ............... 705/7, 11, 1; 395/184.01; 702/179, 182

[56] References Cited

U.S. PATENT DOCUMENTS

| | | | |
|---|---|---|---|
| 5,578,923 | 11/1996 | Chen | 324/309 |
| 5,614,718 | 3/1997 | Brace | 250/339 |
| 5,729,465 | 3/1998 | Barbaresco | 702/76 |
| 5,732,358 | 3/1998 | Sawaya et al. | 455/525 |
| 5,774,829 | 6/1998 | Cisneros et al. | 701/213 |

OTHER PUBLICATIONS

Article: The Stationary Bootstrap. Politis and Romano. Journal of the American Statistical Association. vol. 89, No. 428, Theory and Methods, Dec. 1994.

Primary Examiner—Allen R. MacDonald
Assistant Examiner—M. Irshadullah
Attorney, Agent, or Firm—John L. Rogitz

[57] ABSTRACT

A computer-implemented prediction model evaluation method includes specifying many prediction models and a benchmark model against which the prediction models will be evaluated. A primary data matrix is arranged by data indices, and the primary matrix is sampled with replacement N times to bootstrap N observation matrices. Then, all the matrices are filled with measurement criteria, with each criteria being representative of a respective data index and a respective model. A p-value estimate is returned that measures the statistical significance of the best prediction model relative to the benchmark, where the p-value represents the probability of wrongly rejecting the null hypothesis that a best prediction model has expected performance no better than that of a benchmark. The p-value accounts for the examination of all of the prediction models, i.e., the p-value depends on the examination of all of the models as a group, and not simply on a single model.

18 Claims, 4 Drawing Sheets

Initialize and Execute Bootstrap

Evaluation

SYSTEM AND METHOD FOR TESTING PREDICTION MODEL

FIELD OF THE INVENTION

The present invention relates generally to prediction modelling, and more particularly to systems and methods for testing the effectiveness of prediction models.

BACKGROUND

Prediction models are used to forecast future events on the basis of past performance data. For example, prediction models exist for forecasting the performance of publicly-traded stocks based on "indicators", i.e., particular data pertaining to past stock performance. Similarly, prediction models exist for forecasting the response of a patient to a given medical treatment based on such indicators as age, gender, and known medical history, among other things. Also, prediction models exist for forecasting the outcome of horse races based on certain indicators that can be gleaned from the past performance charts of the horses, and so on.

As recognized herein, it is problematic to ascertain whether a successful forecast is due to luck, or due to the effectiveness of the prediction model used to generate the forecast. As an example, if a prediction model forecasts the winner of a particular horse race, it might be that the successful prediction was a result of a "good" model, but it is also possible that the horse actually won for reasons not accounted for by the model. For example, the prediction model might have used the horse's breeding as an indicator for its forecast, when in fact the horse won because of factors unrelated to breeding. In such a circumstance, the model is not "good", only lucky.

Nevertheless, it might be evaluated under such circumstances that the prediction model is a good model, useful for further forecasts, based on one or more lucky yet successful forecasts. Such lucky forecasts can arise easily when, as is common, a given set of past data is used more than once for purposes of attempting to find a "good" prediction model. This data re-use is referred to as "data snooping". When one engages in data snooping there is thus a significant danger that lucky results will be mistaken for good results.

Accordingly, as also recognized herein, to avoid the adverse consequences of data snooping, it is desirable to provide an indication of the statistical significance of a model's performance. As further recognized herein, one way to measure the statistical significance of a model's performance is to compare the model with the performance of a benchmark model, often one that is simple and straightforward. To use the horse racing analogy, a benchmark model against which the performance of other handicapping models might be compared is "always bet on the favorite".

As still further recognized herein, however, it is desirable to understand the statistical significance of prediction models vis-a-vis a benchmark model in the context of more than a single proposed model, to avoid the adverse consequences of data snooping. That is, the present invention recognizes that it is desirable to generate plural prediction models that use differing combinations of indicators, indicator weighting factors, and so on, and then determine the statistical significance of the best of the models relative to the benchmark. Such consideration of a plurality of models is called a "model specification search", or simply a "specification search", and is a form of data re-use. Stated differently, a statistic that represents the statistical significance of a "best" model vis-a-vis a simple benchmark can be misleading, unless a complete specification search is reflected in the statistic. By accounting for a specification search in the statistic, incorrectly positive evaluations of the effectiveness of a prediction model can be avoided.

The present invention accordingly recognizes the need to provide a computer method for evaluating the statistical significance of the best of a plurality of prediction models, vis-a-vis a benchmark model by computing an estimate of a p-value for a test of the formal null hypothesis that a best prediction model has expected performance no better than that of a benchmark, where the p-value is the probability of wrongly rejecting the null hypothesis on the basis of the evidence provided by the data. Another object of the present invention is to provide a method for evaluating prediction models in the context of several computer-generated models. Still another object of the present invention is to provide a method for evaluating prediction models that is easy to use and cost-effective.

SUMMARY OF THE INVENTION

The invention is a general purpose computer programmed according to the inventive steps herein to evaluate the effectiveness, i.e., predictive ability, of prediction models. The invention can also be embodied as an article of manufacture—a machine component—that is used by a digital processing apparatus and which tangibly embodies a program of instructions that are executable by the digital processing apparatus to evaluate the effectiveness of prediction models. This invention is realized in a critical machine component that causes a digital processing apparatus to perform the inventive method steps herein.

In accordance with the present invention, the method steps include generating the prediction models to be evaluated and generating an effectiveness measurement of the benchmark model using predetermined measurement criteria. The method steps further include generating an effectiveness measurement of each prediction model using the measurement criteria. A statistic is returned that is representative of the statistical significance of the effectiveness of a best one of the prediction models vis-a-vis the benchmark model using the effectiveness measurements, such that the statistic is determined based on the evaluation of all the prediction models.

In a preferred embodiment, a primary data matrix includes data grouped by data indices, such as those related to time periods, and the method steps further include defining a predetermined number of observation data matrices by sampling, with replacement, the primary data matrix. The effectiveness measurements of the models are based on the data. For each data matrix, effectiveness measurements of the benchmark model and the prediction models are generated.

Moreover, in the preferred embodiment, for each data matrix, a difference value that represents the difference between a model and a benchmark effectiveness measurement is generated for the respective data matrix. Also, for each matrix an average difference value is generated that represents the average difference between the effectiveness measurements for the respective data matrix. A maximum primary average difference value is determined among the plurality of models based on the primary data matrix. Likewise, an observation maximum average difference value is determined among the plurality of models for each observation data matrix. The observation maximum difference value is a maximum, among the plurality of models, of the difference between the observation average difference value and the primary difference value.

Still further, in the preferred embodiment the observation maximum average difference values are sorted to generate a sorted list. Then, a location in the sorted list is determined for the maximum primary average difference value. Per the preferred embodiment, the location in the sorted list of the maximum primary average difference value is at the $n^{th}$ location in the list, and the statistic that is representative of the statistical significance of the effectiveness of the best among the prediction models is the difference between unity and the ratio of n to the total number of observation matrices.

In another aspect, a computer-implemented method is disclosed for evaluating the effectiveness of the best among plural prediction models against a benchmark model. The method includes specifying the prediction models and defining a primary matrix arranged by data indices. Then, the primary matrix is sampled with replacement N times to define N observation matrices. Next, the matrices are filled with effectiveness measurement criteria, and each criterion represents a respective data index and a respective model. A statistic is returned that represents the statistical significance of the most effective prediction model, based on the matrices.

In still another aspect of the present invention, a computer program product is disclosed which is readable by a digital processing apparatus and which tangibly embodies a computer program. The computer program product combines a computer readable medium with program code elements that measure the effectiveness of a prediction model. In this invention, the code elements are embodied in a program stored on the computer readable medium.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

This invention relates to determining the efficacy of prediction models, i.e., to generate a numerical measure (denoted herein as "p") by computing an estimate of the p-value for a test of the formal null hypothesis that a best prediction model has expected performance no better than that of a benchmark, where the p-value is the probability of wrongly rejecting the null hypothesis on the basis of the evidence provided by the data. Thus, the p-value is a measure of how well a prediction model is likely to predict future events, compared to a predetermined benchmark prediction model.

Figure 1:
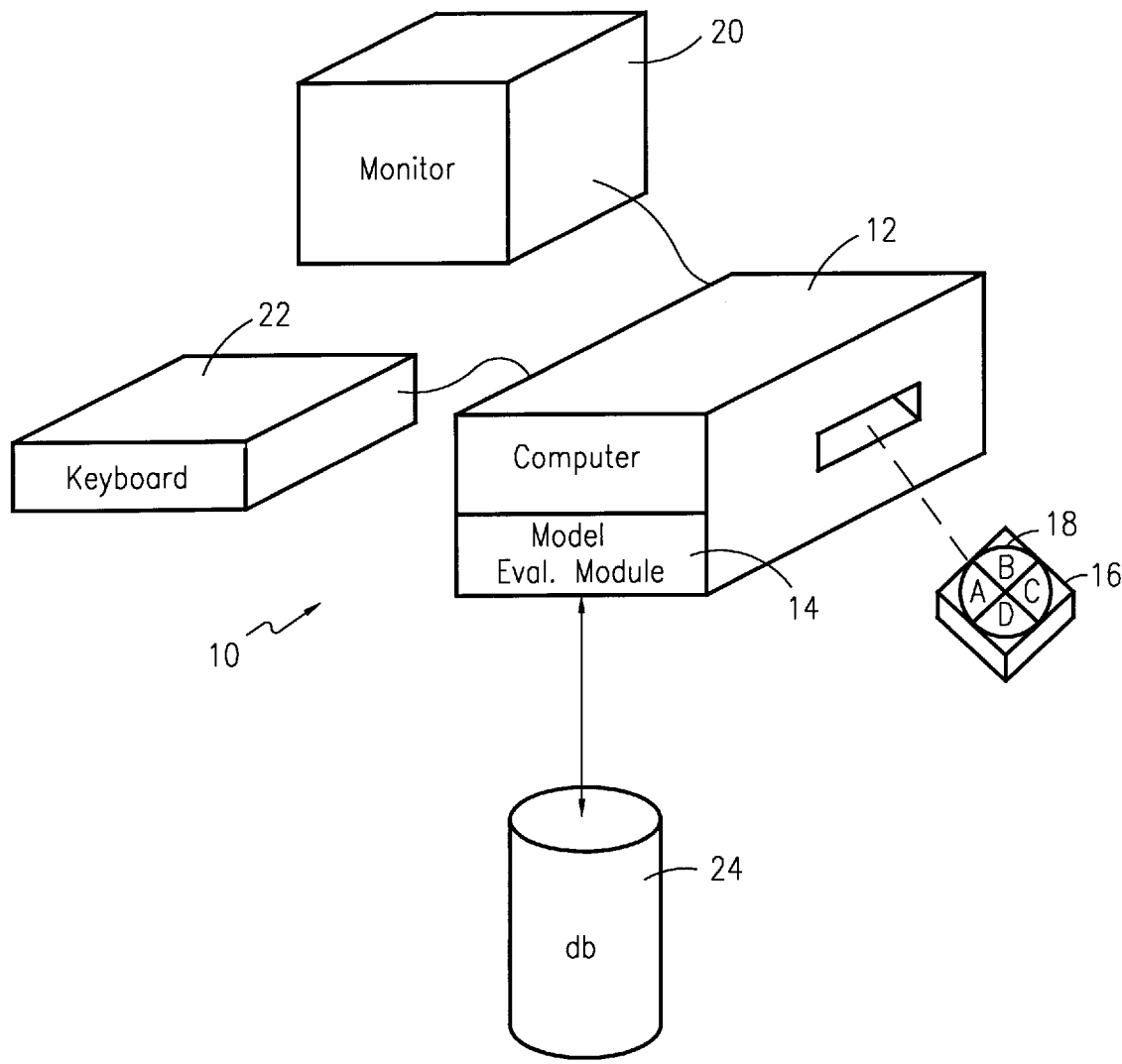
FIG. 1 is a schematic diagram of the prediction model evaluation system of the present invention.

Referring initially to FIG. 1, a system for testing or evaluating the effectiveness, i.e., predictive ability, of prediction models is shown, generally designated 10. In the particular architecture shown, the system 10 includes a digital processing apparatus, such as a computer 12. In one intended embodiment, the computer 12 may be a personal computer (PC) computer made by IBM Corp. of Armonk, N.Y., and use an operating system sold under trademarks such as "Windows". Or, the computer 12 may be a Unix computer, or OS/2 server, or Windows NT server, or IBM RS/6000 250 workstation with 128 MB of main memory running AIX 3.2.5.

As shown, the computer 12 includes a model evaluation module 14 which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 16 shown in FIG. 1. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++language code.

Figure 2:
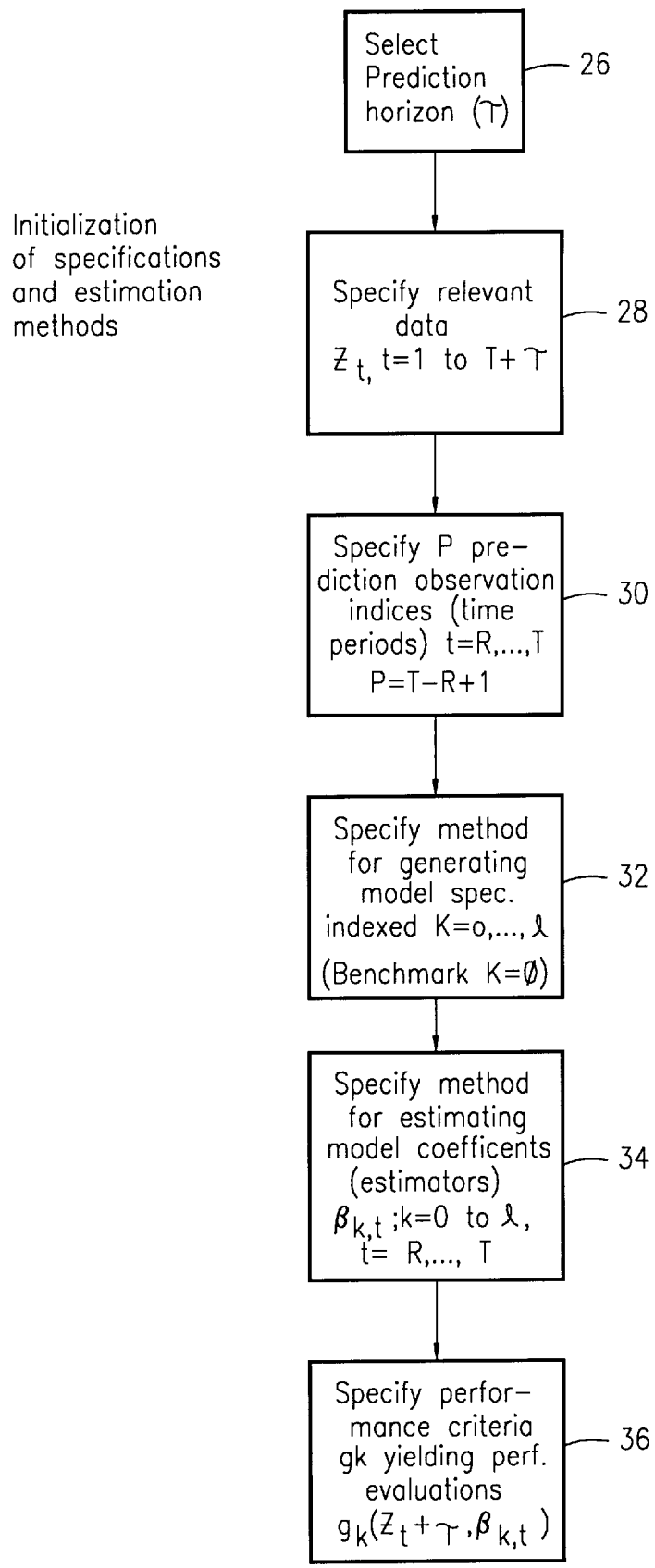
FIG. 2 is a flow chart of the steps for initializing the specifications and estimation measures.
Figure 3:
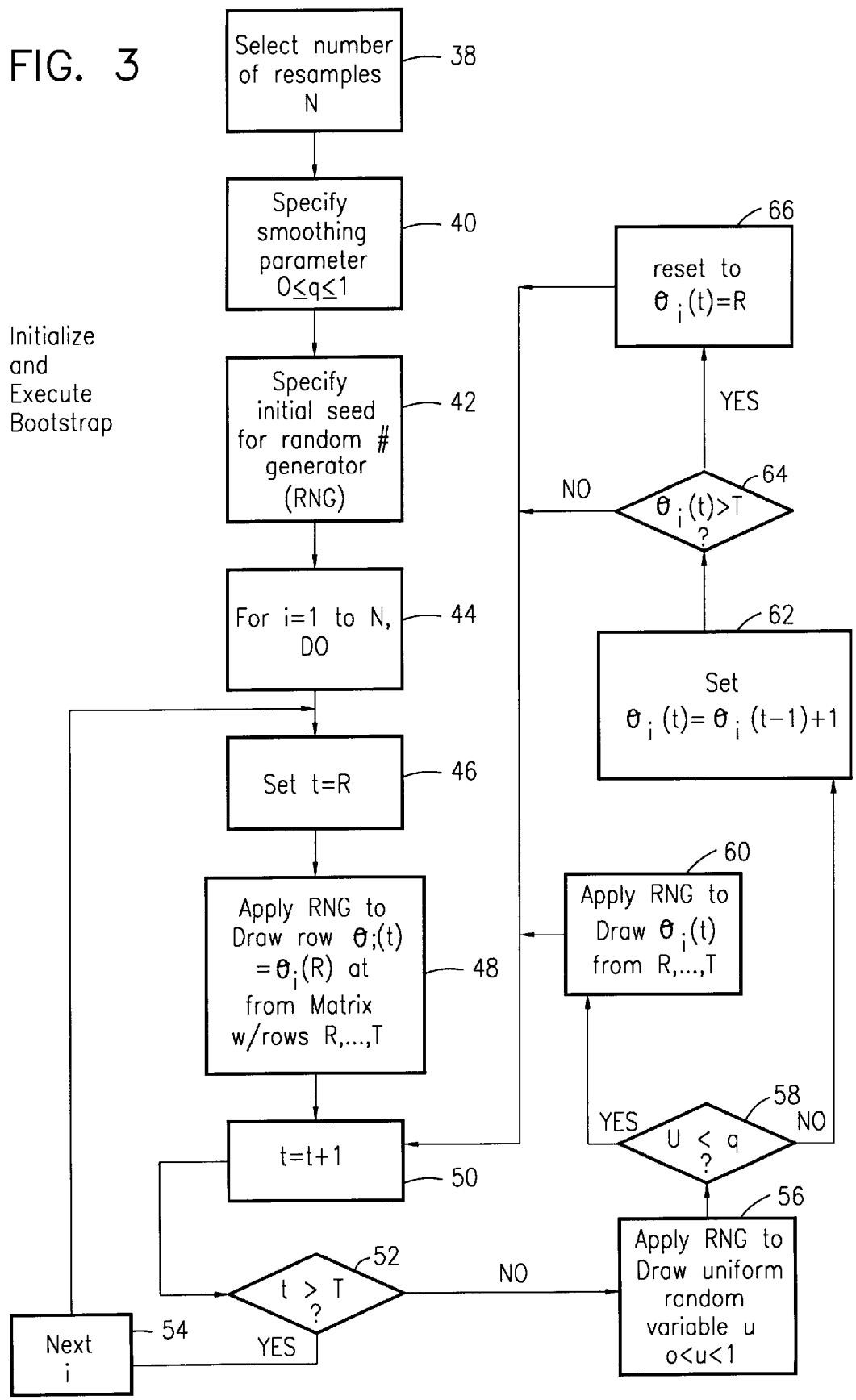
FIG. 3 is a flow chart showing the steps for initializing and executing the "bootstrap" process to sample with replacement the rows of the primary matrix.
Figure 4:
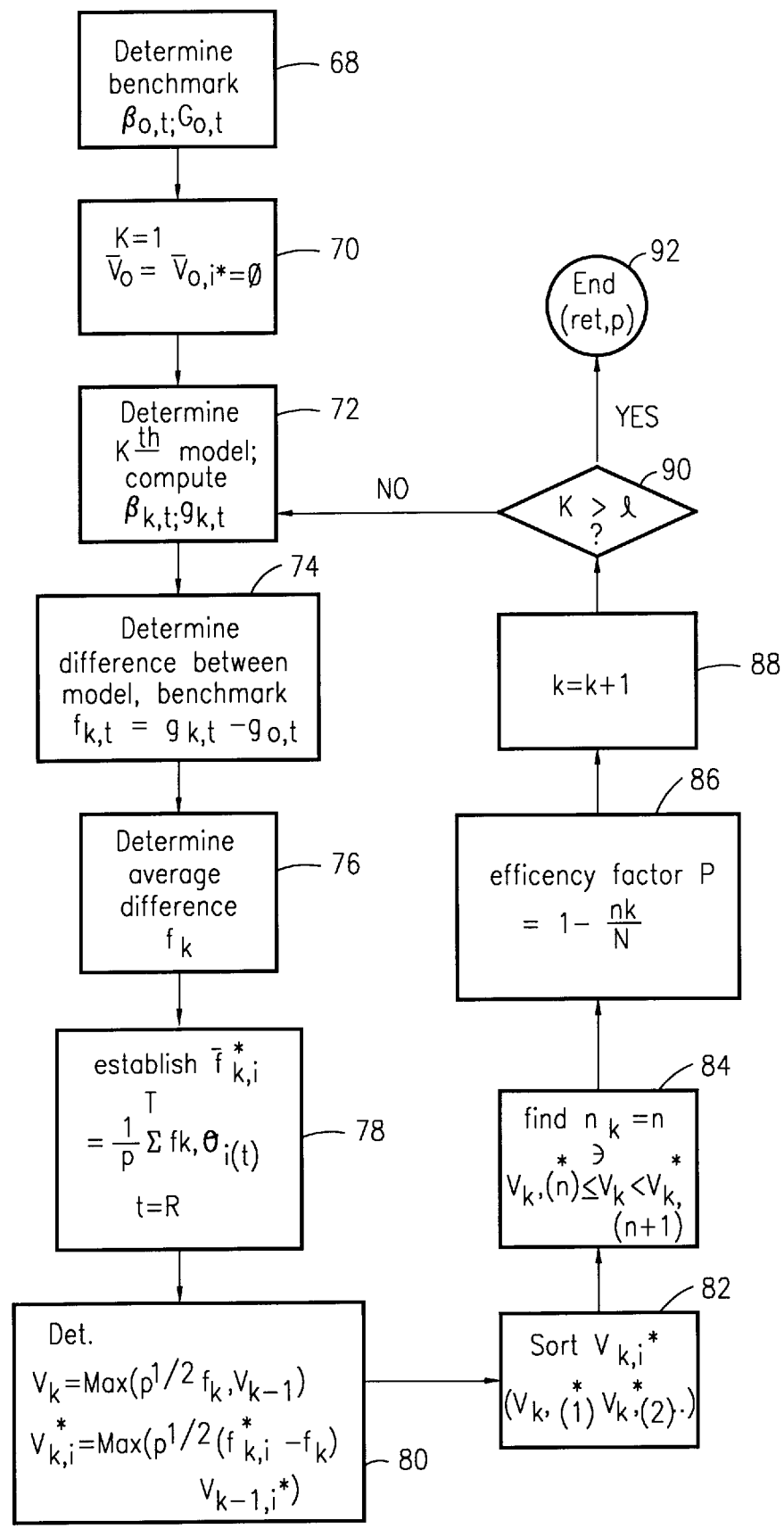
FIG. 4 is a flow chart showing the steps for determining the efficacy value ("p-value") of the best of the prediction models under test.

FIGS. 2–4 illustrate the structure of such instructions as embodied in a computer program. Those skilled in the art will appreciate that the Figures illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 1 as a combination of program code elements A-D in computer readable form that are embodied in a computer-usable data medium 18, on the computer diskette 16. As mentioned above, however, such media can also be found in semiconductor devices, on magnetic tape, and on optical disks.

FIG. 1 shows that the system 10 can include peripheral computer equipment known in the art, including an output device such as a video monitor 20 and an input device such as a computer keyboard 22. Other output devices can be used, such as printers, other computers, and so on. Likewise, input devices other than the keyboard 22 can be used, e.g., trackballs, mice, keypads, touch screens, and voice recognition devices.

Additionally, FIG. 1 shows that the computer 12 accesses a database 24. The database 24 can be internal to the computer 12, or it can be remote from the computer 12.

Now referring to FIG. 2, the initialization steps undertaken by the module 14 can be seen. At block 26, a prediction horizon $\tau$ is specified. The prediction horizon $\tau$ is the point in the future, e.g., one day, to which a model prediction pertains and at which it is desired to assess projected model predictions.

Moving to block 28, the relevant data $Z_t$ from the past is specified, wherein t represents a data index, such as a time period from 1 to T+$\tau$. Per the present invention, each data Z is a vector of "dependent" variables (those to be predicted) and "independent" variables (those to be used for prediction). For example, when the prediction models under test are stock market prediction models, the data points Z might include stock market returns as a dependent variable and price trends, high/low prices, returns on investment, price per earnings ratio, and so on as independent variables.

At block 30, an integer number P of prediction observation indices are specified. Each index t corresponds to an observed data point (such as a past time period), wherein t=R, . . . ,T and thus P=T-R+1. As disclosed in detail below with reference to FIG. 4, the data identified at block 28 is associated with its appropriate data index R, . . . ,T in a primary data matrix. Essentially, the data indices R, . . . ,T define respective matrix row indices.

The process then moves to block 32, wherein a method is specified for generating model specifications indexed by model indices k, wherein k is an integer=0, . . . ,l. In other words, at block 32, a method is specified for generating "l" prediction models.

As an example, it might be desirable to determine whether stock returns in excess of an average is forecastable. In this example, the integer P represents the number of previous trading periods, e.g., days, for which predictions are to be evaluated. The process at block 32 in the present example would specify that, e.g., a set of linear forecasting models are to be generated, each of which models considers certain technical indicators regarding stock prices. Examples of such indicators include lagged returns, local trend measures, relative strength indices, and moving average oscillators. In one instance, it might be desirable that each model consider three indicators out of, as an example, twenty-nine. With the numbers in this example, 3,654 models would be generated (i.e., I=3,654).

Next, at block 34, a method is specified for estimating a set of model coefficients, i.e., estimators of model coefficients, denoted herein as $\beta_{k,t}$. As an example, it might be specified at block 34 that the estimators $\beta_{k,t}$ are to be determined using ordinary least squares (OLS) or recursive least squares for each of the P periods.

For the benchmark model, the model index k=0. As an example, the benchmark model may contain only a constant. Thus, the skilled artisan will recognize that the "null" hypothesis implied in the example discussed herein is, "excess stock market returns are simply a martingale difference sequence, and therefore are not forecastable". For a prediction model to be statistically significant, it must strongly suggest that the null hypothesis is wrong by "beating" the benchmark model.

From block 34, the process moves to block 36 to specify what criteria $g_k$ (a function) will be used for evaluating model performance as $g_k(Z_{t+\tau}, \beta_{k,t})$. Continuing with the present example, the performance criteria specified at block 36 might be accuracy of stock forecast using a squared error of prediction, or returns on investment, and so on.

Referring now to FIG. 3, the method used to define resamples of the relevant data, referred to herein as a "bootstrap" method, is shown. In accordance with the present invention, plural resamples of the primary data matrix are first defined in FIG. 3 and then generated in FIG. 4 to facilitate the process discussed below in reference to FIG. 4, to thereby enable undertaking the present method without resort to an unduly burdensome Monte Carlo simulation.

Commencing at block 38, the number N of data resamples is specified. For example, the number N of data resamples might be one thousand. As discussed more fully below, after the process discussed herein the primary data matrix will be associated with N observation matrices.

Next, at block 40, a smoothing parameter q, 0<q<1, is specified. In accordance with the present invention, the value of the smoothing parameter q is selected based on the statistical dependence of the relevant data. When the relevant data is statistically independent, the value of the smoothing parameter q is one. In the illustrative example discussed herein, the value of the smoothing parameter q is 0.5. From block 40, the process moves to block 42 to define the random number generator seed value.

Once the bootstrap process has been initialized at blocks 38–42, the process moves to block 44 to enter a "DO" loop using a resample counter variable i to define N resamples of the data. Each resample can be regarded as an observation matrix in which each row represents data gathered for a particular one of the P data indices. Essentially, the process below defines the resamples by sampling, with replacement, the primary data matrix defined in FIG. 2. Then, using the process discussed below in reference to FIG. 4, the primary and observation data matrices are filled with the data specified above during process shown in FIG. 2.

At block 46, an index variable t is set equal to the first data index R for which prediction data are to be evaluated. Then, at block 48 a row $\theta_i(t)$ (also referred to as an "observation index") of the $i^{th}$ observation matrix is defined to be the row $\theta_i(R)$ by drawing a row index uniformly and at random from the row indices R, . . . ,T of the primary data matrix. Next, at block 50 the index variable t is incremented by one, and then the process moves to decision diamond 52 to determine whether the index variable t is greater than the value of the last row T of the primary data matrix. If it is, the process moves to block 54 to retrieve the next value for the counter variable i, and then loops back to block 46.

On the other hand, if, at decision diamond 52, it is determined that the index variable t is not greater than the last row T of the primary data matrix, the process moves to block 56 to draw a uniform random variable U independently of all other random variables. The value of the uniform random variable U is between zero (0) and one (1).

Moving to decision diamond 58, it is determined whether the value of the uniform random variable U is less than the value of the smoothing parameter q. If it is, the logic moves to block 60 to define another observation index $\theta_i(t)$ by drawing a row index uniformly and at random from the row indices R, . . . ,T of the primary data matrix. From block 60, FIG. 3 shows that the logic loops back to block 50.

In contrast, if the value of the uniform random variable U is not less than the value of the smoothing parameter q, the process moves from decision diamond 58 to block 62 to define the present observation index $\theta_i(t)$ to be one greater than the previous observation index $\theta_i(t-1)$. Moving to decision diamond 64, it is determined whether the present observation index $\theta_i(t)$ is greater than the last row index T. If not, the process loops back to block 50, but otherwise resets the present observation index $\theta_i(t)$ to the first row index R, prior to looping back to block 50.

After all N observations matrices have been defined by the process shown in FIG. 3, the logic moves to the process shown in FIG. 4 to fill the matrices and then to evaluate the statistical significance of the best one of the prediction models vis-a-vis the benchmark model. Using the specifications defined in FIG. 2, at block 68 the logic determines the coefficients $\beta_{0,t}$ and performance criteria $g_{0,t}=g_0(Z_{t+\tau}, \beta_{0,t})$, t=R, . . . ,T to be used for the benchmark model. Recall that the benchmark model index value for the model index variable k is zero (0). Accordingly, the performance criteria $g_0(Z_{t+\tau, B0,t})$ are inserted into the first column of the primary data matrix as the benchmark criteria.

Next, at block 70 the model index variable k is set equal to one. Also at block 70 an initial maximum primary average difference value $V_0$ and an initial observation maximum average difference value $V_{0,i}^*$, i=1, . . . ,N are set equal to zero. Then, at block 72 the coefficients $\beta_{k,t}$ and performance criteria $g_k(Z_{t+\tau}, \beta_{k,t})$, $t=R, \ldots, T$ are computed using the specifications defined in FIG. 2. Per the present invention, the performance criteria $g_{k,t}=g_k(Z_{t+\tau}, \beta_{k,t})$ are inserted into the second column of the primary data matrix. As the skilled artisan will recognize, the performance criteria $g_{k,t}$ represent effectiveness measurements for the $k_{th}$ model.

Moving to block 74 from block 72, the logic of the present invention determines a performance difference value $f_{k,t}=g_{k,t}-g_{0,t}$ for each row of the first two columns of the primary matrix, i.e., the difference between the $k_{th}$ model criteria and the benchmark model criteria for each of the P indices. This performance difference is inserted into the third column of the primary matrix. The performance difference is then averaged at block 76 to yield an average performance difference value $f_k(avg.)=(1/P)\Sigma f_{k,t}$, the sum being taken over $t=R$ to $T$.

After having generated the primary data matrix as described above, the present invention moves to block 78 to generate the previously-defined N observation matrices, indexed by the resample counter variable i, as follows. For each observation matrix, i=1 to N, an average performance difference value $f_{k,i}*(avg.)$ is determined by computing $(1/P)\Sigma f_{k, Bi(t)}$, the sum being taken over $t=R$ to $T$ for each $i^{th}$ observation matrix.

After the N observation matrices have been generated at block 78, the logic moves to block 80 to determine, for the $k^{th}$ model under test, the maximum primary average difference value $V_k$ using the primary matrix and, for each of the observation matrices, the observation maximum average difference value $V_{k,i}*$, as follows:

$V_k$=maximum of $P_{1/2}f_k$, $V_{k-1}$; and $V_k*$=maximum of $P_{1/2}(f_{k,i}*-f_k)$, $V_{k-1,i}*$.

Thus, the observation maximum average difference value $V_{k,i}*$ is a maximum among the prediction models of the difference between the observation matrix average difference value and the primary matrix difference value.

From block 80, the present invention moves to block 82 to sort the observation maximum average difference values $V_{k,i}*$, from smallest to largest, to generate a sorted list. The sorted values are then denoted $V_{k,(1)}*$, $V_{k,(2)}*$, . . . Then, at block 84 the location in the sorted list is determined for the maximum primary average difference value $V_k$. Specifically, an $n_k$ that equals n is determined such that $V_{k,(n)}* \leq V_k < V_{k,(n+1)}*$.

Moving to block 86, an efficacy factor p, which is a statistic that represents the statistical significance of the effectiveness of the best among the k prediction models relative to the benchmark, is determined. As intended by the present invention, the efficacy factor p is the difference between unity and the ratio of n to the total number of observation matrices. As the skilled artisan will recognize, the efficacy factor p is an estimate of a "p-value" associated with a statistical test of a formal hypothesis that a best prediction model has expected performance no better than that of a benchmark. The efficacy factor varies between zero and one; the more statistically significant the "best" model vis-a-vis the benchmark, the lower the p-value.

The logic then moves to block 88 to increment k by one, and then tests whether the last model has been evaluated at decision diamond 90. If not, the logic loops back to block 72. Otherwise, the model ends at state 92 and returns the final value of the efficacy factor p.

With the above disclosure in mind, it can now be appreciated that the efficacy factor p is determined based on the evaluation of all the prediction models. In other words, the final value for the efficacy factor p depends on the evaluation of all the l prediction models collectively, and it represents the statistical significance of the best model among them, vis-a-vis the benchmark model.

While the particular SYSTEM AND METHOD FOR TESTING PREDICTION MODEL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A computer including a data storage device including a computer usable medium having computer usable code means for evaluating the effectiveness of a best of a plurality of prediction models vis-a-vis a benchmark model, the computer usable code means having:

computer readable code means for receiving, from a computer input device, past market data from a database;

computer readable code means for generating the prediction models to be evaluated, at least one prediction model outputting at least one indicator of predicted performance;

computer readable code means for generating an effectiveness measurement of the benchmark model using predetermined measurement criteria, the predetermined measurement criteria being based on the past market data;

computer readable code means for generating an effectiveness measurement of each prediction model using the measurement criteria;

computer readable code means for determining the best one of a plurality of prediction models;

computer readable code means for generating a statistic representative of the statistical significance of the effectiveness of a best one of the prediction models vis-a-vis the benchmark model using the effectiveness measurements, wherein the statistic is determined based on the evaluation of all the prediction models; and based on the statistic, using the best one of the prediction models to predict future performance.

2. The computer of claim 1, further comprising a primary data matrix including data grouped by data indices, and the computer further comprises computer readable code means for defining a predetermined number of observation data matrices by sampling, with replacement, the primary data matrix, the effectiveness measurements of the models being based on the data.

3. The computer of claim 2, wherein for each data matrix computer readable code means generate effectiveness measurements of the benchmark model and the prediction models, and the computer further comprises:

computer readable code means for generating, for each data matrix, a difference value representative of the difference between the effectiveness measurements of a model and a benchmark for the respective data matrix.

4. The computer of claim 3, wherein for each matrix the computer readable code means generate an average difference value representing the average difference between the effectiveness measurements of a model and a benchmark for the respective data matrix.

5. The computer of claim 4, further comprising:

computer readable code means for determining a maximum primary average difference value among the plurality of models; and computer readable code means for determining an observation maximum average difference value among the plurality of models as a maximum among the plurality of models of the difference between the observation average difference value and the primary difference value.

6. The computer of claim 5, further comprising:

computer readable code means for sorting the observation maximum average difference values to generate a sorted list; and computer readable code means for determining a location in the sorted list for the maximum primary average difference value.

7. The computer of claim 6, wherein the location in the sorted list of the maximum primary average difference value is at the nth location in the list, and wherein the statistic representative of the statistical significance of the effectiveness of the best among the prediction models is the difference between unity and the ratio of n to the total number of observation matrices.

8. A computer-implemented method for evaluating the effectiveness of the best among plural prediction models against a benchmark model, comprising the steps of:

collecting past performance data in a database;

specifying the prediction models;

defining a primary matrix arranged using data indices, the primary data matrix including the past performance data;

sampling the primary matrix with replacement N times to define N observation matrices;

filling the matrices with effectiveness measurement criteria, each criterion being representative of a respective data index and a respective model;

returning a statistic representative of the statistical significance of a most effective prediction model vis-a-vis a benchmark, based on the matrices;

determining the best prediction model;

using the statistic to assess the significance of a best prediction model vis-a-vis the benchmark, and using the best prediction model to predict future performance.

9. The computer-implemented method of claim 8, further comprising the steps of:

generating an effectiveness measurement of the benchmark model using predetermined measurement criteria; and generating an effectiveness measurement of each prediction model using the measurement criteria, wherein the statistic is based on the effectiveness measurements.

10. The computer-implemented method of claim 9, further comprising the steps of:

generating, for each data matrix, a difference value, the difference value being an average difference value representing the average difference between effectiveness measurements of a model and a benchmark for the respective data matrix.

11. The computer-implemented method of claim 10, further comprising the steps of:

determining a maximum primary average difference value among the plurality of models; and determining an observation maximum average difference value among the plurality of models as a maximum among the plurality of models of the difference between the observation average difference value and the primary difference value.

12. The computer-implemented method of claim 11, further comprising the steps of:

sorting the observation maximum average difference values to generate a sorted list; and determining a location in the sorted list for the maximum primary average difference value, wherein the location in the sorted list of the maximum primary average difference value is at the $n^{th}$ location in the list, and wherein the statistic representative of the statistical significance of the effectiveness of the best among the prediction models is the difference between unity and the ratio of n to the total number of observation matrices.

13. A computer program product comprising:

a computer program storage device readable by a digital processing apparatus; and a program mean on the program storage device and including instructions executable by the digital processing apparatus for performing method steps for evaluating plural prediction models, the method steps comprising:

receiving past performance data from a database, the past performance data being input by means of a computer input device;

generating the prediction models to be evaluated, the prediction models outputting one or more indicators of predicted future performance based on the past performance data;

generating an effectiveness measurement of a benchmark model using predetermined measurement criteria;

generating an effectiveness measurement of each prediction model using the measurement criteria;

generating a statistic representative of the statistical significance of the effectiveness of a best one of the prediction models vis-a-vis the benchmark model using the effectiveness measurements, wherein the statistic is determined based on the evaluation of all the prediction models;

based on the statistic, determining the best one of a plurality of prediction models; and using the best one of the prediction models to predict future performance.

14. The computer program product of claim 13, wherein the method steps further comprise:

grouping data in a primary data matrix by appropriate data indices; and generating a predetermined number of observation matrices by sampling, with replacement from the primary data matrix, the effectiveness measurements of the models being based on the data.

15. The computer program product of claim 14, wherein the method steps further comprise:

for each data matrix, generating effectiveness measurements of the benchmark model and the prediction models; and generating, for each data matrix, an average difference value representative of the difference between the effectiveness measurements of a model and a benchmark for the respective data matrix.

16. The computer program product of claim 15, wherein the method steps further comprise:

determining a maximum primary average difference value among the plurality of models; and determining an observation maximum average difference value among the plurality of models as a maximum among the plurality of models of the difference between the observation average difference value and the primary difference value.

17. The computer program product of claim 16, wherein the method steps further comprise:

sorting the observation maximum average difference values to generate a sorted list; and determining a location in the sorted list for the maximum primary average difference value.

18. The computer program product of claim 17, wherein the location in the sorted list of the maximum primary average difference value is at the $n^{th}$ location in the list, and wherein the statistic is the difference between unity and the ratio of n to the total number of observation matrices.

* * * * *